United States Patent
Lane et al.

(10) Patent No.: US 11,068,981 B2
(45) Date of Patent: **\*Jul. 20, 2021**

(54) SYSTEM AND METHOD FOR DISPLAYING TRADE INFORMATION FOR ELECTRONIC TRADING EXCHANGE

(71) Applicant: Trading Technologies International, Inc., Chicago, IL (US)

(72) Inventors: Richard Lane, Chicago, IL (US); Michael Unetich, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 288 days.

This patent is subject to a terminal disclaimer.

(21) Appl. No.: 15/654,292

(22) Filed: Jul. 19, 2017

(65) Prior Publication Data

US 2017/0316504 A1 Nov. 2, 2017

Related U.S. Application Data

(63) Continuation of application No. 14/257,075, filed on Apr. 21, 2014, now Pat. No. 9,741,076, which is a
(Continued)

(51) Int. Cl.
*G06Q 40/00* (2012.01)
*G06Q 40/04* (2012.01)
(Continued)

(52) U.S. Cl.
CPC ............. *G06Q 40/04* (2013.01); *G06Q 30/06* (2013.01); *G06Q 40/06* (2013.01)

(58) Field of Classification Search
CPC .......... G06Q 40/06; G06Q 40/04; G06Q 40/00
See application file for complete search history.

(56) References Cited

U.S. PATENT DOCUMENTS

| 4,674,044 A | 6/1987 | Kalmus et al. |
| 4,750,135 A | 6/1988 | Boilen |

(Continued)

FOREIGN PATENT DOCUMENTS

| EP | 1067471 A1 | 1/2001 |
| WO | 1991/14231 A1 | 9/1991 |

(Continued)

OTHER PUBLICATIONS

Hungarian Intellectual Property Office Search Report and Written Opinion in Singapore Application No. 201108564-4 dated May 21, 2013.
(Continued)

*Primary Examiner* — Mike Anderson

(57) ABSTRACT

An application is disclosed that receives from a host exchange a plurality of trade notifications, each trade notification corresponding to an executed trade, and for each executed trade of interest, may determine whether the executed trade belongs in an aggregated set with one or more other executed trades. The application provides an indicator for indicating whether the corresponding executed trade or aggregated trade traded on the bid side or on the offer side of the market, and which indicates whether additional volume is available at the associated trade price.

14 Claims, 4 Drawing Sheets

Related U.S. Application Data continuation of application No. 12/468,610, filed on May 19, 2009, now Pat. No. 8,744,945.

(51) Int. Cl.
  *G06Q 30/06* (2012.01)
  *G06Q 40/06* (2012.01)

(56) References Cited

U.S. PATENT DOCUMENTS

| | | |
|---|---|---|
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,270,922 A | 12/1993 | Higgins |
| 5,297,031 A | 3/1994 | Gutterman et al. |
| 5,297,032 A | 3/1994 | Trojan et al. |
| 5,454,104 A | 9/1995 | Steidlmayer et al. |
| 5,689,651 A | 11/1997 | Lozman |
| 5,774,877 A | 6/1998 | Patterson, Jr. et al. |
| 5,793,301 A | 8/1998 | Patterson, Jr. et al. |
| 5,797,002 A | 8/1998 | Patterson, Jr. et al. |
| 5,845,266 A | 12/1998 | Lupien et al. |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,667 A | 8/1999 | Tull, Jr. et al. |
| 5,963,923 A | 10/1999 | Garber |
| 5,974,393 A | 10/1999 | McCullough et al. |
| 6,012,046 A | 1/2000 | Lupien et al. |
| 6,014,643 A | 1/2000 | Minton |
| 6,035,287 A | 3/2000 | Stallaert et al. |
| 6,098,051 A | 8/2000 | Lupien et al. |
| 6,131,087 A | 10/2000 | Luke et al. |
| 6,134,535 A | 10/2000 | Belzberg |
| 6,195,647 B1 | 2/2001 | Martyn et al. |
| 6,272,474 B1 | 8/2001 | Garcia |
| 6,278,982 B1 | 8/2001 | Korhammer et al. |
| 6,282,521 B1 | 8/2001 | Howorka |
| 6,408,282 B1 | 6/2002 | Buist |
| 6,418,419 B1 | 7/2002 | Nieboer et al. |
| 6,505,174 B1 | 1/2003 | Keiser et al. |
| 6,618,707 B1 | 9/2003 | Gary |
| 6,766,304 B2 | 7/2004 | Kemp, II et al. |
| 6,772,132 B1 | 8/2004 | Kemp, II et al. |
| 6,938,011 B1 | 8/2005 | Kemp, II et al. |
| 6,993,511 B2 | 1/2006 | Himmelstein |
| 7,124,110 B1 | 10/2006 | Kemp, II et al. |
| 7,127,424 B2 | 10/2006 | Kemp, II et al. |
| 7,181,424 B1 | 2/2007 | Ketchum et al. |
| 7,228,289 B2 * | 6/2007 | Brumfield ............ G06Q 40/00 345/440.2 |
| 7,243,083 B2 | 7/2007 | Burns et al. |
| 7,366,691 B1 | 4/2008 | Kemp, II et al. |
| 7,373,327 B1 | 5/2008 | Kemp, II et al. |
| 7,389,268 B1 | 6/2008 | Kemp, II et al. |
| 7,426,491 B1 | 9/2008 | Singer et al. |
| 7,428,506 B2 | 9/2008 | Waelbroeck et al. |
| 7,451,112 B2 | 11/2008 | Backestrand et al. |
| 7,588,754 B2 | 7/2009 | Singer et al. |
| 7,580,882 B2 * | 8/2009 | West ................... G06Q 40/00 705/37 |
| 7,590,587 B2 | 9/2009 | Duquette |
| 7,593,887 B2 | 9/2009 | Duquette |
| 7,620,587 B2 | 11/2009 | Duquette |
| 7,680,721 B2 | 3/2010 | Cutler |
| 7,680,727 B2 | 3/2010 | Kemp, II et al. |
| 7,685,049 B1 | 3/2010 | Singer |
| 7,707,091 B1 | 4/2010 | Kauffman et al. |
| 7,742,962 B1 | 6/2010 | Singer |
| 7,774,263 B1 * | 8/2010 | Wunsch ............ G06Q 30/0633 705/26.8 |
| 7,813,998 B1 * | 10/2010 | Mauro, Jr. ............ G06Q 40/00 705/37 |
| 7,822,672 B2 | 10/2010 | Hausman |
| 7,974,915 B2 | 7/2011 | Kemp, II et al. |
| 7,979,345 B2 | 7/2011 | Kemp, II et al. |
| 8,027,895 B2 | 9/2011 | Howorka et al. |
| 8,082,203 B1 * | 12/2011 | Mauro, Jr. ............ G06Q 40/04 705/37 |
| 8,126,794 B2 | 2/2012 | Lange et al. |
| 8,145,558 B2 | 3/2012 | Duquette |
| 8,150,760 B2 | 4/2012 | Duquette |
| 8,150,761 B2 | 4/2012 | Duquette |
| 8,204,822 B2 | 6/2012 | Kemp, II et al. |
| 8,229,837 B2 | 7/2012 | Duquette |
| 8,407,131 B2 | 3/2013 | Kemp, II et al. |
| 8,423,373 B2 | 4/2013 | Singer |
| 8,676,697 B2 | 3/2014 | Kemp, II et al. |
| 8,744,945 B2 | 6/2014 | Lane et al. |
| 8,762,257 B2 | 6/2014 | Singer |
| 8,781,947 B2 | 7/2014 | Duquette |
| 9,805,417 B2 | 10/2017 | Kemp, II et al. |
| 10,055,790 B2 | 8/2018 | Singer |
| 2001/0003179 A1 | 6/2001 | Martyn |
| 2001/0037284 A1 | 11/2001 | Finkelstein et al. |
| 2002/0007335 A1 | 1/2002 | Millard et al. |
| 2002/0023038 A1 | 2/2002 | Fritsch et al. |
| 2002/0035534 A1 | 3/2002 | Buist et al. |
| 2002/0052827 A1 | 5/2002 | Waelbroeck et al. |
| 2002/0055899 A1 | 5/2002 | Williams |
| 2002/0059129 A1 | 5/2002 | Kemp, II et al. |
| 2002/0072980 A1 | 6/2002 | Dutta |
| 2002/0073017 A1 | 6/2002 | Robertson |
| 2002/0099644 A1 | 7/2002 | Kemp, II et al. |
| 2002/0120551 A1 | 8/2002 | Jones |
| 2002/0138401 A1 | 9/2002 | Allen et al. |
| 2002/0178104 A1 | 11/2002 | Hausman |
| 2003/0004852 A1 | 1/2003 | Burns |
| 2003/0004853 A1 | 1/2003 | Ram et al. |
| 2003/0009411 A1 | 1/2003 | Ram et al. |
| 2003/0023542 A1 | 1/2003 | Kemp, II et al. |
| 2003/0033239 A1 | 2/2003 | Gilbert et al. |
| 2003/0069834 A1 | 4/2003 | Cutler |
| 2003/0126155 A1 | 7/2003 | Parker et al. |
| 2003/0236737 A1 | 12/2003 | Kemp, II et al. |
| 2004/0034591 A1 | 2/2004 | Waelbroeck et al. |
| 2004/0117292 A1 | 6/2004 | Brumfield et al. |
| 2004/0148242 A1 | 7/2004 | Liu |
| 2004/0162772 A1 | 8/2004 | Lewis |
| 2004/0260639 A1 | 12/2004 | Lundberg et al. |
| 2005/0049954 A1 | 3/2005 | Graham et al. |
| 2005/0228735 A1 | 10/2005 | Duquette |
| 2005/0267836 A1 | 12/2005 | Crosthwaite et al. |
| 2006/0085317 A1 | 4/2006 | Allen |
| 2006/0195389 A1 | 8/2006 | Kemp, II et al. |
| 2006/0259382 A1 * | 11/2006 | Kemp, II ............ G06Q 20/10 705/35 |
| 2006/0265317 A1 | 11/2006 | Duquette |
| 2006/0265320 A1 | 11/2006 | Duquette |
| 2006/0293999 A1 | 12/2006 | Tanpoco et al. |
| 2007/0038556 A1 * | 2/2007 | Kemp, II ............ G06Q 30/08 705/37 |
| 2007/0088648 A1 | 4/2007 | Mather et al. |
| 2007/0100735 A1 | 5/2007 | Kemp, II et al. |
| 2007/0136133 A1 | 6/2007 | Li |
| 2008/0010186 A1 * | 1/2008 | Weimer ................. G06Q 40/04 705/37 |
| 2008/0086401 A1 | 4/2008 | Mather |
| 2008/0162333 A1 | 7/2008 | Kemp, II et al. |
| 2008/0215477 A1 * | 9/2008 | Annunziata ............ G06Q 40/04 705/37 |
| 2009/0018968 A1 | 1/2009 | Ardell et al. |
| 2009/0076899 A1 | 3/2009 | Gbodimowo |
| 2009/0132409 A1 * | 5/2009 | Lutnick ................. G06Q 40/04 705/37 |
| 2009/0157534 A1 | 6/2009 | Arsiwala |
| 2009/0182656 A1 | 7/2009 | Tully et al. |
| 2009/0240630 A1 | 9/2009 | Casey et al. |
| 2009/0292650 A1 | 11/2009 | Duquette |
| 2009/0292651 A1 | 11/2009 | Duquette |
| 2009/0292652 A1 | 11/2009 | Duquette |
| 2009/0319441 A1 | 12/2009 | Duquette |

(56) References Cited

U.S. PATENT DOCUMENTS

| | | |
|---|---|---|
| 2010/0076907 A1 | 3/2010 | Rosenthal et al. |
| 2010/0100830 A1 | 4/2010 | Singer |
| 2010/0131404 A1 | 5/2010 | Kemp, II et al. |
| 2010/0131405 A1 | 5/2010 | Kemp, II et al. |
| 2010/0293109 A1 | 11/2010 | Jain et al. |
| 2010/0299280 A1 | 11/2010 | Lane et al. |
| 2011/0225083 A1 | 9/2011 | Kemp, II et al. |
| 2011/0251942 A1* | 10/2011 | Rosenthal .............. G06Q 40/04 705/37 |
| 2012/0203683 A1 | 8/2012 | Duquette |
| 2012/0233058 A1 | 9/2012 | Kemp, II et al. |
| 2013/0159162 A1 | 6/2013 | Kemp, II et al. |
| 2013/0211997 A1 | 8/2013 | Singer |
| 2013/0218739 A1 | 8/2013 | Kmiec et al. |
| 2014/0279376 A1 | 9/2014 | Duquette |
| 2014/0316966 A1 | 10/2014 | Singer |
| 2014/0337196 A1 | 11/2014 | Lane et al. |
| 2014/0379545 A1 | 12/2014 | Kemp, II et al. |
| 2018/0018437 A1 | 1/2018 | Kemp, II et al. |
| 2018/0330441 A1 | 11/2018 | Singer |

FOREIGN PATENT DOCUMENTS

| | | |
|---|---|---|
| WO | 1995/26005 A1 | 9/1995 |
| WO | 1998/49639 A1 | 11/1998 |
| WO | 1999/19821 A1 | 4/1999 |
| WO | 1999/30259 A1 | 6/1999 |
| WO | 1999/53424 A1 | 10/1999 |
| WO | 2000/52619 A1 | 9/2000 |
| WO | 2000/62187 A2 | 10/2000 |
| WO | 2000/62187 A3 | 10/2000 |
| WO | 2000/65510 A1 | 11/2000 |
| WO | 2001/16830 A1 | 3/2001 |
| WO | 2001/16852 A2 | 3/2001 |
| WO | 2001/16852 C1 | 3/2001 |
| WO | 2001/22315 A2 | 3/2001 |
| WO | 2001/22315 A3 | 3/2001 |
| WO | 2001/65403 A2 | 9/2001 |
| WO | 2001/88808 A1 | 11/2001 |
| WO | 2002/59815 A1 | 1/2002 |
| WO | 2002/15461 A2 | 2/2002 |
| WO | 2002/29686 A1 | 4/2002 |
| WO | 2002/48945 A1 | 6/2002 |
| WO | 2002/69226 A2 | 9/2002 |
| WO | 2002/79940 A2 | 10/2002 |
| WO | 2002/93325 A2 | 11/2002 |
| WO | 2003/090032 A2 | 10/2003 |
| WO | 2003/090032 A3 | 12/2003 |

OTHER PUBLICATIONS

International Search Report of PCT/US2003/018436.
International Search Report and Written Opinion of PCT/US10/35416.
CQG, "CQG Integrated Client Basics, Version 7.9, May 18, 2009" [Retrieved Jul. 1, 2010] Retrieved from the Internet, <URL:http://www.cqg.com/Docs/CQG_Basics_UG_7x9.pdf>.
Kharouf, A Trading Room with a View, Futures, vol. 27, Nov. 1998.
USPTO Presentation, NASDAQ, Nov. 8, 2001.
www.tradingtechnologies.com/products/xtrade_full.html (viewed May 22, 2001) Jun. 9, 2000.

* cited by examiner

| | 117 | 26 | | | | |
|---|---|---|---|---|---|---|
| 400.3 | 400.2 | 400.1 | 400.0 | 399.9 | 399.8 | 399.7 |
| | | | 100 | 13 | | 27 |

*FIG. 2*

| TRADEWINDOW | | | |
|---|---|---|---|
| EDIT INSTRUMENTS | MIN QTY: 1 | ALERT QTY: 1000 | |
| 09:02:02 | GE:BF H1-M1-U1 | 1.0 | 112 |
| 09:02:19 | GEM9-GEM0 | 46.5 | 15 |
| 09:02:22 | GEU9-GEH0 | 22.5 | 33 |
| 09:02:23 | GEM9-GEM0 | 16.5 | 5 |
| 09:02:26 | GEU9-GEH0 | 22.5 | 266 |
| 09:02:26 | GEU1-GEZ1 | 22.0 | 19 |
| 09:02:27 | GEM9-GEM0 | 46.5 | 5 |
| 09:02:27 | GEU9-GEH0 | 22.5 | 10 |

| TRADEWINDOW | | | |
|---|---|---|---|
| EDIT INSTRUMENTS | MIN QTY: 1 | ALERT QTY: 1000 | |
| 09:02:02 | GE:BF H1-M1-U1 | 1.0 | 106 |
| 09:02:02 | GE:BF H1-M1-U1 | 1.0 | 6 |
| 09:02:19 | GEM9-GEM0 | 46.5 | 15 |
| 09:02:19 | GEU9-GEH0 | 22.5 | 30 |
| 09:02:22 | GEU9-GEH0 | 22.5 | 3 |
| 09:02:22 | GEM9-GEM0 | 16.5 | 5 |
| 09:02:23 | GEU9-GEH0 | 22.5 | 10 |
| 09:02:24 | GEU9-GEH0 | 22.5 | 10 |
| 09:02:24 | GEU9-GEH0 | 22.5 | 70 |
| 09:02:24 | GEU9-GEH0 | 22.5 | 35 |
| 09:02:24 | GEU9-GEH0 | 22.5 | 16 |
| 09:02:25 | GEU9-GEH0 | 22.5 | 10 |
| 09:02:25 | GEU9-GEH0 | 22.5 | 47 |
| 09:02:25 | GEU9-GEH0 | 22.5 | 1 |
| 09:02:25 | GEU9-GEH0 | 22.5 | 2 |
| 09:02:25 | GEU9-GEH0 | 22.5 | 5 |
| 09:02:26 | GEU9-GEH0 | 22.5 | 10 |
| 09:02:26 | GEU1-GEH0 | 22.5 | 30 |
| 09:02:26 | GEU1-GEZ1 | 22.5 | 20 |
| 09:02:26 | GEU1-GEZ1 | 23.0 | 5 |
| 09:02:26 | GEU1-GEZ1 | 23.0 | 14 |
| 09:02:27 | GEM9-GEM0 | 46.5 | 5 |
| 09:02:27 | GEU9-GEH0 | 22.5 | 3 |
| 09:02:27 | GEU9-GEH0 | 22.5 | 5 |
| 09:02:27 | GEU9-GEH0 | 22.5 | 2 |

FIG. 4 ically called a "trade ticker" on the display screens of the user devices. Because new trade information is constantly being appended over the course of a trading session, as new

SYSTEM AND METHOD FOR DISPLAYING TRADE INFORMATION FOR ELECTRONIC TRADING EXCHANGE

CROSS REFERENCE TO RELATED APPLICATIONS

This application is a continuation of U.S. patent application Ser. No. 14/257,075, filed Apr. 21, 2014, now U.S. Pat. No. 9,741,076, which is a continuation of U.S. patent application Ser. No. 12/468,610, filed May 19, 2009, now U.S. Pat. No. 8,744,945, the contents of each of which are fully incorporated herein by reference for all purposes.

FIELD OF THE INVENTION

The present invention relates to electronic trading systems and more particularly, to a system and method for displaying executed trade information including aggregated trade information and/or market side information.

BACKGROUND

Trading exchanges have advanced from in-person floor trading operations to technology-enabled electronic trading exchanges that allow remote users to participate in various markets. In general, sellers submit sell orders (offers or asks) with prices at which they will sell a specified quantity of tradable objects, and buyers submit buy orders (bids) with prices at which they will buy a specified quantity of tradable objects. A tradable object, as used herein, refers to any object which can be traded with a price and a quantity, and includes various items such as stocks, bonds, funds, futures, spreads, options, commodities, etc. In an electronic trading exchange, a host exchange disseminates to all connected participants market information relating to bids, offers, and trades in order to provide the same transparency that floor traders are provided. Sellers try to sell at the highest price and buyers try to buy at the lowest price, and an exchange matching system facilitates the matching of bids and offers in order to execute trades. In many electronic exchanges, disseminated trade notifications typically include the tradable object for which the trade occurred, the price upon which the buyer and seller agreed, the number of shares or contracts that traded, and the exchange-time of the trade.

Trade notifications rarely include any other descriptive information in addition to what is specified above. In particular, the parties involved in the trade typically are not revealed and most exchanges report every trade individually, regardless of whether or not the trade resulted from a larger buy or sell order. For example, if there are 100 different sellers each attempting to sell a single futures contract at the same price, and if a buyer submits a buy order at that price and with a quantity of 100, this will result in 100 separate trade notifications being generated, even though just a single buy order is involved. Similarly, many trade notifications can be generated when there is a single sell order of a larger quantity which is divided up between multiple different buyers.

Trade notifications are received on the trader side by a trader system which includes user devices and a trading application running for example on a server. The trade notifications are processed in a desired manner, and the associated trade information is then displayed in what is typically called a "trade ticker" on the display screens of the user devices. Because new trade information is constantly being appended over the course of a trading session, as new trades occur, the new trades are typically added to the end of the list of trades on the ticker, and as they accumulate, the oldest trades are removed to make room for the more recent trades.

Because this raw trade information can be overwhelming and trades can occur so rapidly that they are scrolled off the screen before a trader has time to recognize and interpret them, typically trading applications include features which allow the trader to specify filters to eliminate some of the so-called "noise", which is information that is not relevant to that trader. For example, a trader may want to only be notified of trades for a particular tradable object, or even a subset of a tradable object. If a trader is trading IBM stock, he may not care about every Google trade. Additionally, since certain stocks like IBM may trade hundreds of millions of times in a day, a trader may only want to be notified of trades with quantities larger than or equal to a predetermined amount, such as 1,000 shares. Traditional trading applications often have a filter by size feature to filter out those trades with quantities that are less than a predetermined amount and display only those trades having quantities greater than or equal to the predetermined amount.

Although such a filter feature can help to eliminate a lot of irrelevant information, it can also lead to the unintentional elimination of important data. For example, if there are 35 different sellers each attempting to sell less than 1000 contracts of a specified futures contract at the same price and with a total quantity of 25,000 contracts, and if a buyer submits a buy order at that price and with a quantity of 25,000, this will result in 35 separate trades and 35 corresponding trade notifications being generated, each having an associated trade quantity of less than 1000 contracts. In this case, if a trader wants to have displayed only those trades with quantities greater than 1000 contracts, the trader will not be aware that these trades occurred and will unfortunately miss the fact that 25,000 contracts have traded.

Traders base their decisions to buy and sell on many factors, and knowing what objects are trading, at what price, and when they are trading are all important factors. However, other factors can also be helpful and are not conveyed using traditional trading applications. For example, traditional tickers, while displaying the trade price, do not convey whether the executed trade traded on the bid side or the offer side of the market. Further, traditional tickers displaying trade information do not convey whether further volume is available at a specific price.

SUMMARY

Therefore, it would be advantageous for a trading application and method to group smaller trades into an aggregated trade for display when it is likely that a single larger buy or sell order is involved, while retaining the ability to filter out and not display trades having quantities or aggregated quantities less than a predetermined amount. Further, it would advantageous to provide market side information and/or remaining available volume at the trade price corresponding to each displayed trade. A trading application which displays aggregated trade information, market side information, and/or remaining volume information helps the trader assimilate and process a large amount of information such that informed and rapid trading decisions can be made.

In at least some embodiments, the present invention relates to a method for displaying trade information. The method includes receiving from a host exchange a plurality of trade notifications, each trade notification corresponding to an executed trade and including an associated identification of the tradable object traded, an associated trade price, an associated trade quantity, and an associated trade execution time. For each executed trade of interest, a trading application determines whether the executed trade belongs in an aggregated set with one or more other executed trades, wherein all executed trades in an aggregated set are for the same associated tradable object, have traded at the same associated trade price, and have been executed within a predetermined time period of each other. For each aggregated set, the trading application causes to be displayed on a user display the corresponding executed trades in the set as a single aggregated trade with the associated identification of the tradable object traded, the associated trade price, and an associated aggregated quantity. For each executed trade of interest not in an aggregated set, the trading application causes to be displayed on the user display the associated identification of the tradable object traded, the associated trade price, and the associated trade quantity.

In other embodiments, the invention relates to a method for displaying trade information, the method including receiving from a host exchange a plurality of trade notifications, each trade notification corresponding to an executed trade and including an associated identification of the tradable object traded, an associated trade price, an associated trade quantity, and an associated trade execution time. The method also includes receiving from a host exchange a plurality of bid and offer notifications, each bid or offer notification corresponding to a respective buy or sell order and including an associated identification of the tradable object, an associated bid or offer price, and an associated bid or offer quantity. For each executed trade of interest, a trading application compares the associated trade price to at least one of a highest bid price and a lowest offer price corresponding to the associated tradable object traded existing at the time of the executed trade to determine whether the executed trade occurred on a bid side or on an offer side of the market. For each executed trade of interest, the trading application causes the associated identification of the tradable object traded, the associated trade price, and the associated trade quantity to be displayed on a user display, wherein each executed trade is displayed using an associated visual or audio indicator for indicating whether it traded on the bid side or on the offer side of the market. An associated visual indicator can be color, and each displayed trade can further indicate by color whether additional volume exists at the associated trade price.

BRIEF DESCRIPTION OF THE FIGURES

FIG. 2 is an illustration of a display screen showing buy (bid) and sell (ask) orders and corresponding prices;

FIG. 4 is an illustration of side by side display screens showing trade information including aggregated traded on the left side in accordance with at least one aspect of the invention and original trade information on the right side.

DETAILED DESCRIPTION

The present invention is described herein with reference to one or more exemplary embodiments, however, it should be understood that the present invention is not limited to these embodiments. Those skilled in the art will appreciate that other arrangements and other elements can be used instead, and some elements may be omitted altogether. Further, as in most electronic systems, those skilled in the art will appreciate that various components can be implemented as discrete or distributed components, and various functions can be implemented by software, hardware, and/or firmware. For example, a processor executing a set of machine language instructions stored in memory (software) may perform various functions. Provided with the present disclosure describing several functions, those skilled in the art can readily prepare appropriate computer instructions to enable such functions.

Figure 1:
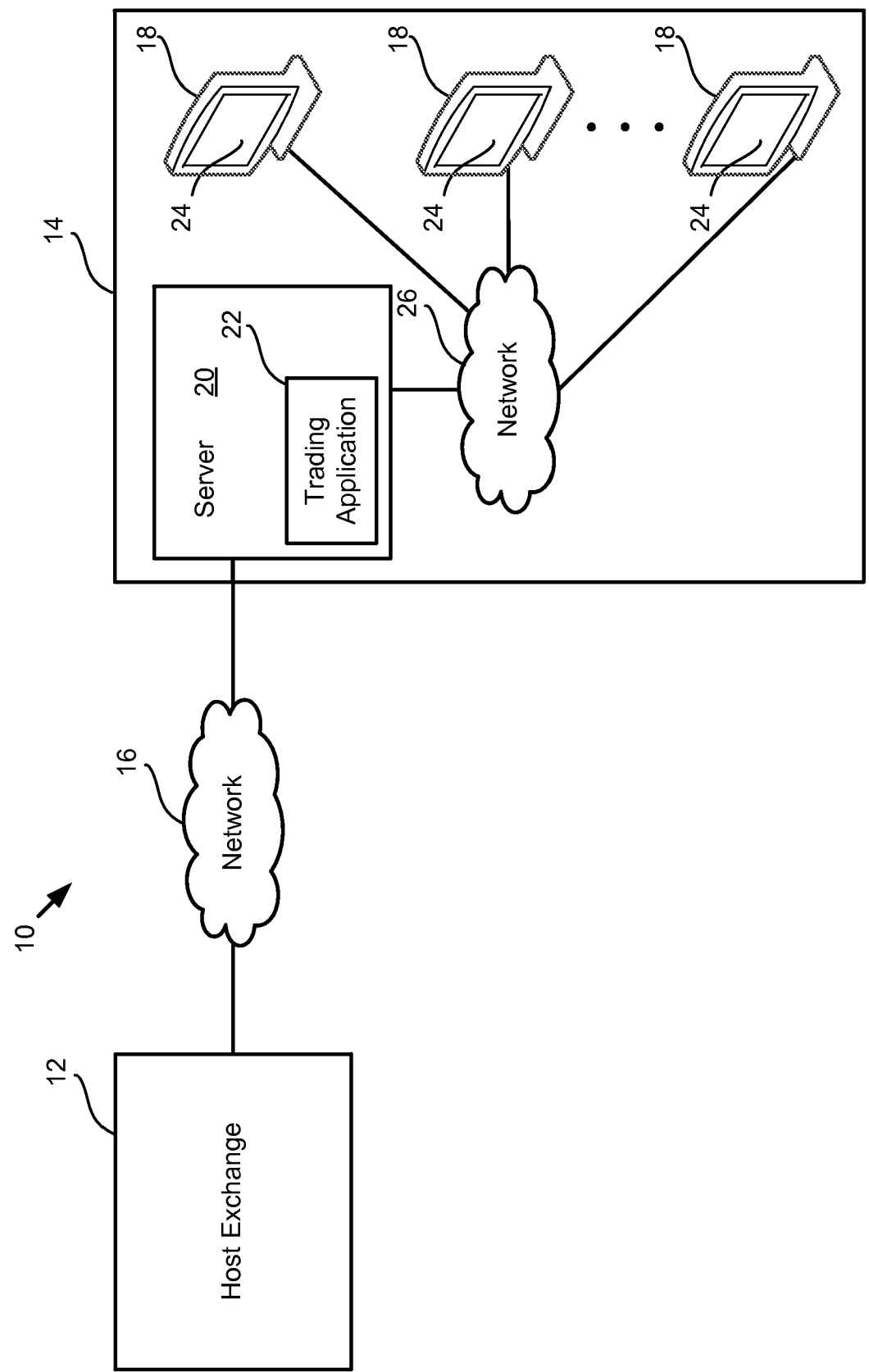
FIG. 1 is a block diagram of an exemplary electronic trading exchange system in accordance with at least one aspect of the invention.

Referring to FIG. 1, a block diagram of an exemplary electronic trading exchange system 10 is illustrated which includes a host exchange 12 in communication with one or more trader systems 14 via one or more networks 16. This system 10 allows traders to electronically participate in the market using user devices 18 to receive and evaluate market information and submit buy and sell orders for any of a variety of tradable objects supported by that exchange system.

The host exchange 12 includes various computers, servers, and applications, and is supported by any of a variety of exchange organizations, such as the Chicago Board of Trade, the New York Stock Exchange, the Chicago Mercantile Exchange, or the like. As is known, the host exchange performs several functions including the receipt and review of the submitted buy and sell orders, and the prioritization and matching of these orders to generate executed trades. Further, the host exchange continually provides market information to the trader systems, including bid and offer notifications and trade notifications. Each bid or offer notification corresponds to one of the submitted buy or sell orders and includes an identification of the associated tradable object, bid or offer price, and quantity desired. Each trade notification corresponds to one of the executed trades and includes an identification of the associated tradable object traded, the trade price, the trade quantity, and the execution time. Different exchanges can provide this information in various formats and ways, such as reporting every order or trade as it occurs, or reporting at pre-specified time intervals.

The network 16 provides electronic communication between the host exchange 12 and the trader system 14 and can take any of a variety of forms, including the Internet, wired or wireless connections, secured or unsecured communication, as is known.

Similarly, the trader system 14 can be implemented in a variety of ways, with the illustrated embodiment including a server 20 or processor for receiving the market information from the host exchange and capable of running a software trading application 22 which extracts relevant trade information and causes it to be displayed in a trade ticker on the display screen 24 of one or more of the user devices 18. The user devices 18 can take various forms such as personal computers or hand-held devices and can be connected to the server via a network 26, such as a local or wide area network, in a wired or wireless manner.

In general, the trading application 22 facilitates the display of market information such as executed trades and associated prices and quantities on display screens 24 of respective user devices 18, wherein certain executed trades are aggregated when defined conditions are met, and wherein trades having quantities below a predetermined threshold can be filtered out and not displayed, as more fully described below. Further, the trading application 22 facilitates the display of other important trade information such as whether a trade has occurred on the bid side or the offer side of the market, and whether additional trade volume is available. This new information is provided to the trader in an intuitive way, so that just by looking at the displayed trades in the trade ticker, this additional trade information can be quickly understood and acted upon by the trader.

Most exchanges such as host exchange 12 provide notifications corresponding to all submitted buy and sell orders, including information relating to modifications or cancellations, and executed trades as they occur and so it is up to the trader system 14 to maintain a current state or "book" for each tradable object, which is a consolidation of all the information related to prices and quantities for that tradable object. For example, the trading application 22 keeps track of this current state information and also facilitates the display of this information by displaying existing buy and sell order prices and quantities in a manner such as shown in FIG. 2. The first column displays buy order quantities, the second column displays prices, and the third column displays sell order quantities. Each buy order quantity in the first column is aligned in the same row as an associated price in the second column, and each sell order quantity in the third column is also aligned in the same row as an associated price in the second column. For example, the current state information presented in FIG. 2 has incorporated the following information for Google shares (GOOG):

a sell order of 117 shares at a price of $400.2
a sell order of 26 shares at a price of $400.1
a buy order of 100 shares at a price of $400.0
a buy order of 13 shares at a price of $399.9
a buy order of 27 shares at a price of $399.7

As described below, this consolidated buy and sell order information can be used to provide meaningful information to supplement the trade information, to determine whether an executed trade occurred on the bid side or offer side of the market and to determine whether remaining volume is available at the associated trade price. For example, using the example shown in FIG. 2, if a trade notification then comes along for GOOG at a price of $400.1 per share for 26 shares, at that moment, it can be determined that the entire offer at that price has traded and no additional volume is currently available at that trade price.

As for the determination of market side information, the current inside market (highest buy order price/lowest sell order price at a point in time) for a tradable object allows the determination of whether the object traded by someone "lifting" the offer (buying at the resting sell order price) or by someone "hitting" the bid (selling at the resting buy order price). For example, if the trade price for a share of GOOG is $400.0 and the current market has a bid price of $400.0 and an offer price of $400.1, then the trade occurred on the bid side of the market.

Knowing this additional information can be helpful to a trader to make informed decisions regarding buying and selling that tradable object, because it provides insight into movement and momentum of the market, and provides valuable insight to the trader regarding the current ability or inability to transact at that price.

Figure 3:
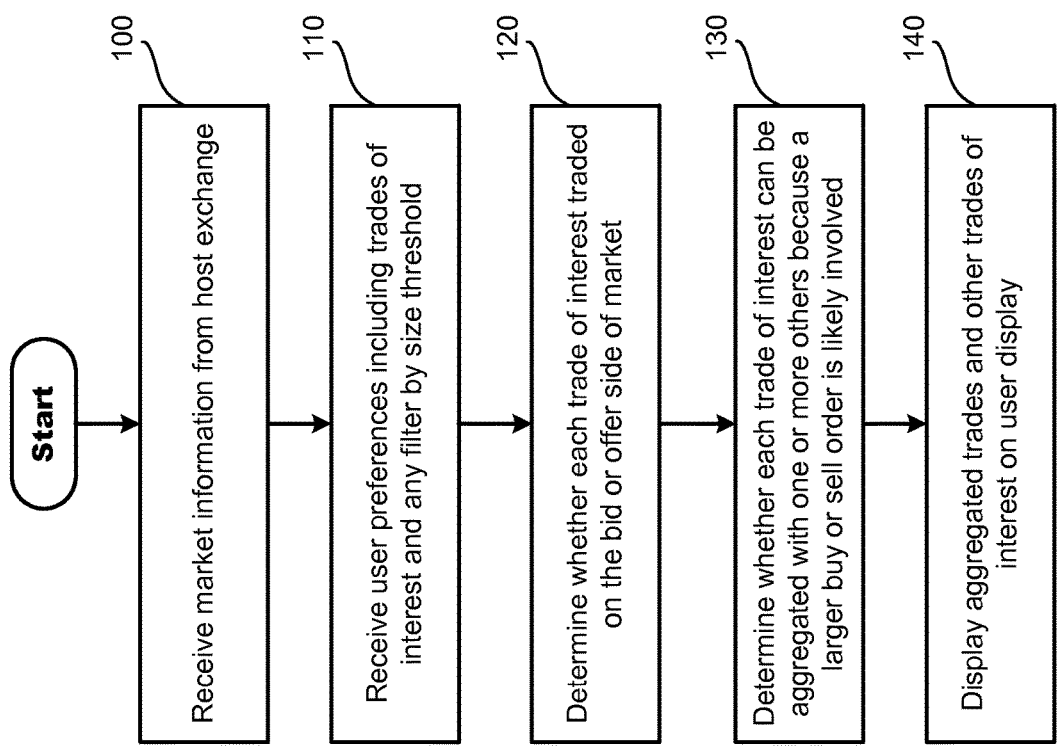
FIG. 3 is a flow chart of an exemplary method for displaying trade information in accordance with at least one aspect of the invention.

Referring now to FIG. 3, a method is illustrated showing the steps performed by the trading application 22 of the trader system to display trade information on a ticker on a user display. At a step 100, market information is received from the host exchange. In particular, the trading application receives from the host exchange a plurality of trade notifications. Each trade notification corresponds to one of the executed trades, and includes an associated identification of the tradable object traded, an associated trade price, an associated trade quantity, and an associated trade execution time. The trading application also receives from the host exchange a plurality of bid and offer notifications, each bid or offer notification corresponding to a respective buy order or sell order of a tradable object, and including an associated identification of the tradable object involved, an associated bid or offer price, and an associated bid or offer quantity.

At a step 110, the trading application receives any user preferences regarding which executed trades are of interest, such as which tradable objects are of interest, and whether any filters should be applied in order to prevent the display of trades having quantities less than (or less than or equal to) a predetermined threshold quantity. For example, a trader can specify via the user device that only GOOG trades are of interest and should be displayed, and only those GOOG trades with quantities greater than or equal to (or greater than) 1000 shares should be displayed. In the absence of a user selection, a default threshold quantity can be used to prevent the display of trades having associated quantities below that default amount. For example, a default threshold can be a set value such as 100 shares or contracts or a value selected in a previous session.

At a step 120, for each executed trade of interest, the associated trade price is compared to at least one of a current highest bid price and a lowest offer price corresponding to the associated tradable object and existing at the associated trade execution time to determine whether the executed trade occurred on a bid side or on an offer side of the market.

At a step 130, for each executed trade of interest, it is determined whether that trade and any other executed trades belong in an aggregated set. Certain conditions can be defined such that when met, executed trades in the aggregated set are assumed to correspond to a larger buy or sell order. In one embodiment, if there are two or more executed trades for the same tradable object at the same price and within a predetermined time period, such as three seconds, the executed trades are deemed to be part of the same aggregated set. The trading application can utilize a default predetermined time period or a trader can specify a desired predetermined time period. The determination of a likely aggregated trade composed of smaller trades can be further refined with other conditions such as requiring that no intervening trades occur involving different tradable objects. This is because if a buy or sell order is matched with multiple sell or buy orders and multiple trades are executed, it can be safely assumed that the host exchange will disseminate all trade notifications that correspond to those multiple trades before disseminating any other trade information.

Another consideration to determine whether or not reported trades should be aggregated is by evaluating the state of the market when the trades occurred, and only aggregating those trades which occurred on the same bid or offer side of the market. Thus in a preferred embodiment, executed trades are aggregated when they are for the same tradable object at the same trade price, are executed within a predetermined time period of each other without an intervening trade of a different tradable object, and all occur on the same bid or offer side of the market.

Consider the following examples showing trade times, an identification of the tradable object, prices, and associated quantities. If the following three trades occur in rapid succession, then the two GOOG trades are not aggregated because of the intervening IBM trade:

| | | | |
|---|---|---|---|
| 09:02:19 | GOOG | 402.22 | 16 |
| 09:02:19 | IBM | 106.32 | 105 |
| 09:02:19 | GOOG | 402.22 | 4 |

If the following trades occur, these trades are not aggregated because different trade prices are involved:

| | | | |
|---|---|---|---|
| 09:02:19 | GOOG | 402.2 | 16 |
| 09:02:19 | GOOG | 402.1 | 92 |
| 09:02:19 | GOOG | 402.2 | 102 |

In this case, because the trade with a different price is in between two other trades at the same price, the trades could not have resulted from a single buy or sell order. Aggregation is not appropriate because then relevant information would not be conveyed to the trader—namely that GOOG was trading on both sides of the market. In this example, each GOOG trade would be separately displayed on the user display.

Consider the following trades:

| | | | | | |
|---|---|---|---|---|---|
| 1. | 09:02:19 | GOOG | 402.21 | 16 | determined to have traded on offer side |
| 2. | 09:02:20 | GOOG | 402.21 | 92 | determined to have traded on bid side |
| 3. | 09:02:20 | GOOG | 402.21 | 102 | determined to have traded on bid side |
| 4. | 09:02:20 | GOOG | 402.22 | 44 | determined to have traded on bid side |
| 5. | 09:02:21 | GOOG | 402.21 | 22 | determined to have traded on offer side |
| 6. | 09:02:21 | GOOG | 402.21 | 2 | determined to have traded on offer side |

The trading application would form a first aggregated set for trades 2 and 3 and a second aggregated set for trades 5 and 6. Trades 1 and 4 are not part of aggregated sets. In other words, if two or more executed trades occur for the same tradable object and at the same price, without any intervening trades, and within a predetermined time period specified by the trader (for example, three seconds), but these executed trades occurred on both sides of the market, the trades are not aggregated.

At a step 140, the executed trades of interest are displayed in a ticker on a user display. In particular, for each aggregated set, an aggregated trade is displayed with the associated identification of the tradable object that was traded, the associated aggregated quantity, the associated trade price, and optionally an execution time. Similarly, for each executed trade of interest which is not in an aggregated set, the associated identification of the tradable object is displayed, along with the associated trade quantity and the associated trade price, and optionally the execution time.

In a preferred embodiment, each displayed trade is displayed using an associated visual or audio indicator, such as color, for indicating whether it traded on the bid side or on the offer side of the market. For example, the color can be blue if the trade traded on the bid side and red if the trade traded on the offer side of the market. Color is useful because it is a visual indicator which is quickly perceived and interpreted. Other indicators such as fonts or icons for conveying this information can also be used.

Thus in the previous example, the following will be displayed (assuming no filtering by size) with one or more items associated with each displayed trade, and preferably the entire trade information, in an associated color as indicated below:

| | | | | |
|---|---|---|---|---|
| 09:02:19 | GOOG | 402.21 | 16 | [in red] |
| 09:02:20 | GOOG | 402.21 | 194 | [in blue] |
| 09:02:20 | GOOG | 402.22 | 44 | [in blue] |
| 09:02:21 | GOOG | 402.21 | 24 | [in red] |

The associated color for each displayed trade can further indicate whether additional volume exists at the trade price. How much additional volume is available is determined by referencing the current state of the tradable object then existing. Specifically, if no additional volume exists at the trade price, the associated color is lighter compared to when additional volume is available. For example, if no additional volume is available, then the displayed trade will be shaded light blue to indicate the last price traded in its entirety on the bid side, or light red (pink) to indicate it traded in its entirety on the offer side.

As a final example, consider the case wherein several tradable objects are being monitored, with the occurrence of the following trades:

| | | | | | |
|---|---|---|---|---|---|
| 1. | 09:02:02 | GE:BF H1-M1-U1 | 1.0 | 106 | [on bid side] |
| 2. | 09:02:02 | GE:BF H1-M1-U1 | 1.0 | 6 | [on bid side, no add'l volume] |
| 3. | 09:02:19 | GEM9-GEM0 | 46.5 | 15 | [on offer side] |
| 4. | 09:02:19 | GEU9-GEH0 | 22.5 | 30 | [on offer side] |
| 5. | 09:02:22 | GEU9-GEH0 | 22.5 | 3 | [on offer side] |
| 6. | 09:02:22 | GEM9-GEM0 | 46.5 | 5 | [on offer side] |
| 7. | 09:02:23 | GEU9-GEH0 | 22.5 | 10 | [on offer side] |
| 8. | 09:02:24 | GEU9-GEH0 | 22.5 | 10 | [on offer side] |
| 9. | 09:02:24 | GEU9-GEH0 | 22.5 | 70 | [on offer side] |
| 10. | 09:02:24 | GEU9-GEH0 | 22.5 | 35 | [on offer side] |
| 11. | 09:02:24 | GEU9-GEH0 | 22.5 | 16 | [on offer side] |
| 12. | 09:02:24 | GEU9-GEH0 | 22.5 | 10 | [on offer side] |
| 13. | 09:02:25 | GEU9-GEH0 | 22.5 | 47 | [on offer side] |
| 14. | 09:02:25 | GEU9-GEH0 | 22.5 | 1 | [on offer side] |
| 15. | 09:02:25 | GEU9-GEH0 | 22.5 | 2 | [on offer side] |
| 16. | 09:02:25 | GEU9-GEH0 | 22.5 | 5 | [on offer side] |
| 17. | 09:02:25 | GEU9-GEH0 | 22.5 | 10 | [on offer side] |
| 18. | 09:02:26 | GEU9-GEH0 | 22.5 | 30 | [on offer side] |
| 19. | 09:02:26 | GEU9-GEH0 | 22.5 | 20 | [on offer side, no add'l volume] |
| 20. | 09:02:26 | GEU1-GEZ1 | 23.0 | 5 | [on bid side] |
| 21. | 09:02:26 | GEU1-GEZ1 | 23.0 | 14 | [on bid side, no add'l volume] |
| 22. | 09:02:27 | GEU9-GEM0 | 46.5 | 5 | [on offer side] |
| 23. | 09:02:27 | GEU9-GEH0 | 22.5 | 3 | [on offer side] |
| 24. | 09:02:27 | GEU9-GEH0 | 22.5 | 5 | [on offer side, no add'l volume] |
| 25. | 09:02:27 | GEU9-GEH0 | 22.5 | 2 | [on offer side] |

In this example, the trading application 22 will operate in a manner such that trades 1 and 2 will be aggregated, trade 3 will not be aggregated, trade nos. 4 and 5 will be aggregated, trade no. 6 will not be aggregated, trade nos. 7-19 will be aggregated, trade nos. 20 and 21 will be aggregated, trade no. 22 will not be aggregated, and trades nos. 23-25 will be aggregated. Therefore, the following trade information will be displayed:

| | | | | |
|---|---|---|---|---|
| 09:02:02 | GE:BF H1-M1-U1 | 1.0 | 112 | [in light blue] |
| 09:02:19 | GEM9-GEM0 | 46.5 | 15 | [in red] |
| 09:02:22 | GEU9-GEH0 | 22.5 | 33 | [in red] |
| 09:02:22 | GEM9-GEM0 | 46.5 | 5 | [in red] |
| 09:02:26 | GEU9-GEH0 | 22.5 | 266 | [in pink] |
| 09:02:26 | GEU1-GEZ1 | 23.0 | 19 | [in light blue] |
| 09:02:27 | GEU9-GEM0 | 46.5 | 5 | [in red] |
| 09:02:27 | GEU9-GEH0 | 22.5 | 10 | [in red] |

FIG. 4 is an illustration of side by side display screens of the above example, showing on the left side a display of the trade information using the aggregation of trading application 22, and showing on the right side the original trade information. Because FIG. 4 is in black and white, it is unable to specifically show the visual indicators described above. Of note is that trade nos. 7-19 in the trade ticker on the right side, corresponding to executed trades of 266 contracts of GEU9-GEH0 which are the result of a single buy order, take up 13 lines, and these can be replaced by a single line in the trade ticker on the left using the trading application 22 of the present application. This provides a significant advantage to the trader, in that small quantities do not need to be added or estimated to understand the scope of these trades. Additionally, if a trader had chosen to show only trades with quantities of 100 or more, none of the trades on the right side would have been displayed because each associated quantity is less than 100. In contrast, this trade information would still be displayed in the ticker on the left side.

In summary, the trading application 22 provides a trade ticker that smartly consolidates executed trades that belong to each other and therefore makes the trade ticker easier to follow. Especially during fast market times, each displayed trade likely remains on the trade ticker for a longer period of time before being displaced by newer trades, in contrast to prior art trading applications which don't aggregate trades and where many smaller trades can easily quickly cover multiple screens and result in the quicker disappearance of prior trades. Additionally, providing aggregated quantities to the trader is a major benefit because it eliminates having to add or approximate the total number of shares or contracts traded in many smaller trades. Further, aggregation allows a filter by size feature to be implemented without the risk of losing key information.

By evaluating a current state of the market when trade notifications are disseminated, certain information can be determined that is not provided in the disseminated market information, namely, whether executed trades occurred on the bid side or the offer side of the market, and whether additional volume remains at the trade price. This information enables a trader to make decisions by describing with more certainty the momentum or state of a market and whether further trading volume at that price is possible. This is in contrast to prior art trading applications which display trade information and merely indicate "upticks" and "downticks" in a market such as by way of an up arrow or a down arrow associated with a displayed trade to indicate price movement of the most recent price to the previous price.

For example, an active trader is often concerned with what direction the market is currently moving and whether specific prices are available to trade something, especially if the trader is concurrently engaging in another trade, in order to set up a spread position for example. The trading application 22 and resulting display described above provides more complete information to the trader if a market is already in the process of moving, saving time and effort. For example, assume the inside market prices corresponding to a particular tradable object are $14/$15. Assume that the trader system determines that the last trade price of $14.5 occurred on the offer side, and no volume remains on the offer side. As described above, this trade information would then be displayed in pink, informing the trader that no additional volume exists at that offer price to be bought. If instead a spread trader knows he can buy at that price, he may offer to sell something else at a level he considers a better sale. The $14.5 offer for that trade is his 'lean'. He was doing another trade 'leaning' on the info that he could buy that market at $14.5.

With prior art tickers, an up arrow only indicates that $14.5 was a higher trade price than the previous trade. A trader can assume with a certain probability that the latest trade traded on the offer side of the market at the time of the trade notification (since $14 was previous and lower), but he cannot safely assume that the $14.5 offer is still there to buy. So the prior art ticker has left an information gap, and the trader would have to go check another display screen showing bids, offers and prices for that tradable object to see whether the inside market is now 13.5/14.5, 14/14.5, 14/15, or 14.5/15. It could be any of those, and important seconds can elapse in the process of checking.

However, the pink indication on the ticker of the present invention tells a trader that at that moment, there is definitely not a 14.5 offer, so caution should be employed. A new 14.5 offer may come in to the market, but the trader at least knows the important information that he lost his lean so he needs to re-access the other actions he is contemplating. The only informational gap that the ticker of the present invention has left is whether the market is now 14/15 or 14.5/15, but the fact that the offer $14.5 price has traded out and no volume is available is very useful and doesn't leave the information gap that an arrow would.

Assume now instead that the last trade price of $14.5 occurred on the bid side, and additional volume is available. This would be indicated by a blue $14.50 price on the ticker. This lets the trader know that there is still at least some quantity bid at the price at least at that moment. It is possible that the $14.5 bid may disappear and the trader is left momentarily unaware, but trading decisions are determined more by what is the state at an exact moment, with the understanding that what may happen next cannot be predicted with certainty.

Thus, this trading application 22 and resultant user display enables a trader to operate in a more efficient, accurate, and convenient manner. For a market-maker, this increased efficiency translates into more liquid and deeper markets, one of the great and envied attributes of this country's capital markets.

It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A method including:
   receiving by a computing device a plurality of trade notifications, wherein each of the plurality of trade notifications corresponds to a matched trade for a tradable object, wherein each of the plurality of trade notifications is for the same tradeable object, wherein each of the plurality of trade notifications includes a trade quantity and a trade price, wherein the trade price is the same for each of the plurality of trade notifications, wherein each of the plurality of trade notifications corresponds to a matched trade on a side for the tradable object, wherein the side is the same for each of the plurality of trade notifications, wherein the side is one of a buy side and a sell side, wherein the plurality of trade notifications includes a last notification;
   aggregating by the computing device the plurality of trade notifications in an aggregated set based on the trade price included in each trade notification;
   providing by the computing device an aggregated trade indicator representing the aggregated set, wherein the aggregated trade indicator represents the sum of the trade quantities of the plurality of trade notifications at the trade price of the plurality of trade notifications;

determining by the computing device, in response to receiving the last notification, whether no quantity remains available on the side for the tradable object at the trade price of the last notification by comparing the trade quantity of the last notification and a total quantity available on the side for the tradable object at the trade price of the last notification before receiving the last notification; and providing by the computing device a no quantity remains indicator representing that no quantity remains available on the side for the tradable object at the trade price of the last notification in response to determining that no quantity remains, wherein the no quantity remains indicator is provided by one of: (i) as part of the aggregated trade indicator and (ii) in relation to the aggregated trade indicator.

2. The method of claim 1, wherein the computing device includes a server.

3. The method of claim 1, wherein the computing device includes a hand-held device.

4. The method of claim 1, wherein the computing device includes a display.

5. The method of claim 1, wherein providing the no quantity remains indicator includes displaying a visual indicator.

6. The method of claim 5, wherein the visual indicator includes a color.

7. The method of claim 1, further including generating an audio indicator when the no quantity remains indicator is provided.

8. A non-transitory computer readable medium having stored therein instructions executable by a processor, including instructions executable to:

receive a plurality of trade notifications, wherein each of the plurality of trade notifications corresponds to a matched trade for a tradable object, wherein each of the plurality of trade notifications is for the same tradeable object, wherein each of the plurality of trade notifications includes a trade quantity and a trade price, wherein the trade price is the same for each of the plurality of trade notifications, wherein each of the plurality of trade notifications corresponds to a matched trade on a side for the tradable object, wherein the side is the same for each of the plurality of trade notifications, wherein the side is one of a buy side and a sell side, wherein the plurality of trade notifications includes a last notification;

aggregate the plurality of trade notifications in an aggregated set based on the trade price included in each trade notification;

provide an aggregated trade indicator representing the aggregated set, wherein the aggregated trade indicator represents the sum of the trade quantities of the plurality of trade notifications at the trade price of the plurality of trade notifications;

determine, in response to receiving the last notification, whether no quantity remains available on the side for the tradable object at the trade price of the last notification by comparing the trade quantity of the last notification and a total quantity available on the side for the tradable object at the trade price of the last notification before receiving the last notification; and provide a no quantity remains indicator representing that no quantity remains available on the side for the tradable object at the trade price of the last notification in response to determining that no quantity remains, wherein the no quantity remains indicator is provided by one of: (i) as part of the aggregated trade indicator and (ii) in relation to the aggregated trade indicator.

9. The non-transitory computer readable medium of claim 8, wherein a server includes the processor.

10. The non-transitory computer readable medium of claim 8, wherein a hand-held device includes the processor.

11. The non-transitory computer readable medium of claim 8, wherein a computing device includes a display and the processor.

12. The non-transitory computer readable medium of claim 8, wherein providing the no quantity remains indicator includes displaying a visual indicator.

13. The non-transitory computer readable medium of claim 12, wherein the visual indicator includes a color.

14. The non-transitory computer readable medium of claim 8, wherein the instructions are further executable to generate an audio indicator when the no quantity remains indicator is provided.

* * * * *